(12) United States Patent
Deschambault

(10) Patent No.: US 8,757,662 B2
(45) Date of Patent: Jun. 24, 2014

(54) TOP FOR A VEHICLE

(71) Applicant: Bombardier Recreational Products Inc., Valcourt (CA)

(72) Inventor: Martin Deschambault, Sherbrooke (CA)

(73) Assignee: Bombardier Recreational Products Inc., Valcourt, Quebec (*) Notice: Subject to any disclaimer, the term of this patent is extended or adjusted under 35 U.S.C. 154(b) by 0 days.

(21) Appl. No.: 13/847,741

(22) Filed: Mar. 20, 2013

(65) Prior Publication Data

US 2014/0117653 A1 May 1, 2014

Related U.S. Application Data

(60) Provisional application No. 61/720,656, filed on Oct. 31, 2012.

(51) Int. Cl.
*B60R 21/13* (2006.01)

(52) U.S. Cl.
USPC .......................................................... 280/756

(58) Field of Classification Search
USPC .................................. 280/756; 296/218, 219
See application file for complete search history.

(56) References Cited

U.S. PATENT DOCUMENTS

| | | | | |
|---|---|---|---|---|
| 3,954,150 | A * | 5/1976 | Cole et al. | 180/89.12 |
| 5,820,199 | A * | 10/1998 | Camplin et al. | 296/102 |
| 6,189,962 | B1 * | 2/2001 | Henderson | 296/218 |
| 7,828,364 | B2 * | 11/2010 | Causey | 296/136.12 |
| 8,322,749 | B2 * | 12/2012 | Srabstein | 280/756 |

* cited by examiner

*Primary Examiner* — Faye M. Fleming
(74) *Attorney, Agent, or Firm* — BCF LLP

(57) ABSTRACT

A top for a vehicle having a roll cage. The top includes a rigid cover, and a flexible cover having a first end and a second end defining a length of the flexible cover therebetween. The first end of the flexible cover is attached to the rigid cover. The second end of the flexible cover has at least one fastener for attaching the second end to the roll cage. The flexible cover has an open configuration and a storage configuration. In the open configuration, the flexible cover extends along the roll cage from the first end attached to the rigid cover to the second end attached to a portion of the roll cage spaced from the rigid cover. In the storage configuration, the entire length of the flexible cover including the second end is removably secured against the rigid cover. Roll cage and top assemblies, and vehicles are also disclosed.

20 Claims, 12 Drawing Sheets

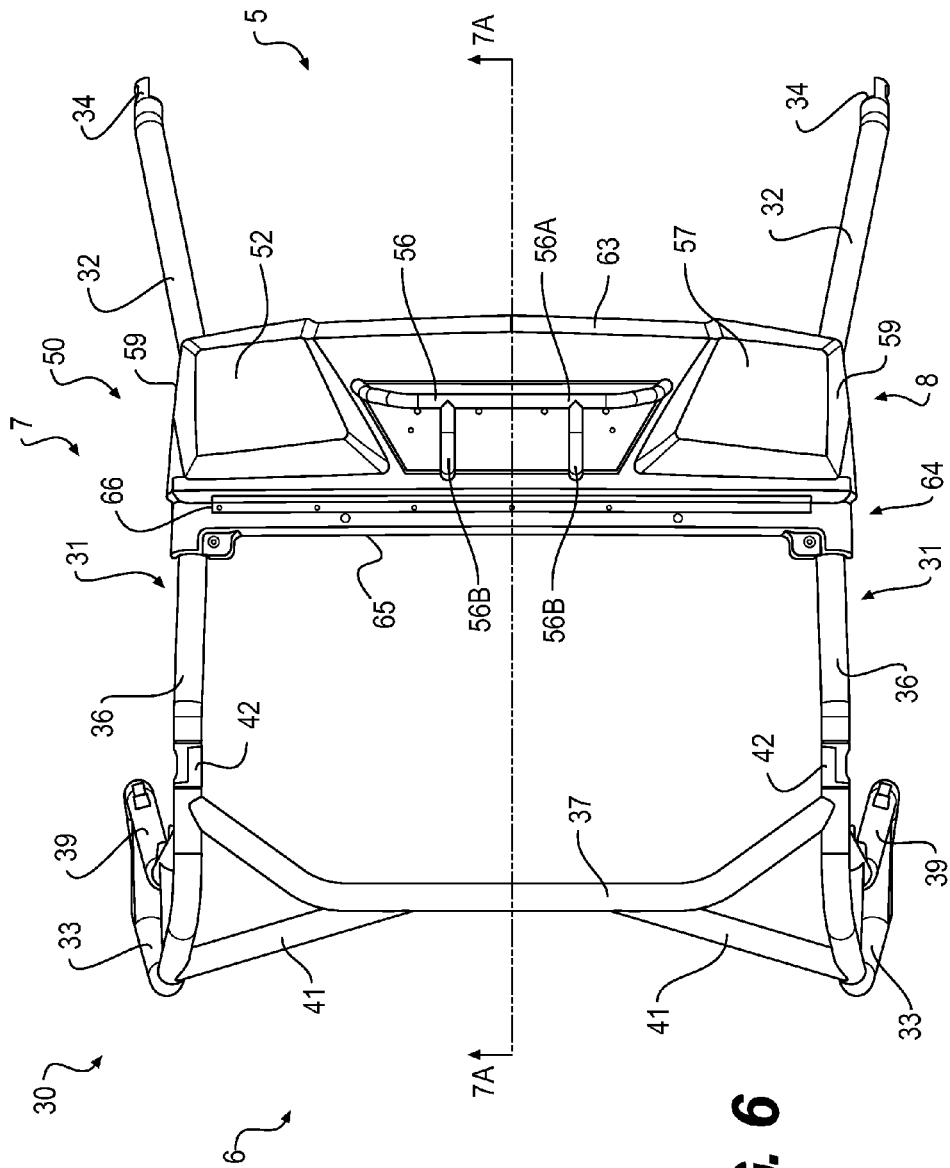

TOP FOR A VEHICLE

CROSS-REFERENCE

The present application claims priority to U.S. Provisional Patent Application No. 61/720,656 filed on Oct. 31, 2012, the entirety of which is incorporated herein by reference.

FIELD OF THE INVENTION

The present invention relates generally to tops for vehicles.

BACKGROUND

Vehicles in which the cockpit area is not enclosed by the vehicle body are commonly provided with tops to protect the riders of the vehicle from sun, rain and snow. Two different versions of tops are used—hard tops and soft tops. Both types of tops are typically removable from the vehicle.

Hard tops offer more protection and can also be integrated with other accessories, such as lights, storage compartments, and the like. Hard tops, however, are cumbersome to remove, and once removed, cannot be easily stored on the vehicle.

Soft tops, on the other hand, are relatively easily stored on the vehicle since they can be rolled up or folded for convenient storage. Soft tops, however, cannot support much weight and therefore cannot be used to mount other accessories.

There is a need for a top for a vehicle that is easily assembled and disassembled, that provides adequate protection from the elements to the riders, that can support vehicle accessories, and that, when not in use, can be stored on the vehicle without much inconvenience to the riders or requiring much space.

SUMMARY

It is an object of the present invention to ameliorate at least some of the inconveniences present in the prior art.

In one aspect, the present provides a top for a vehicle having a roll cage disposed over a seat of the vehicle. The top includes a rigid cover; and a flexible cover having a first end and a second end defining a length of the flexible cover therebetween. The first end of the flexible cover is attached to the rigid cover. The second end of the flexible cover has at least one fastener for attaching the second end to the roll cage. The flexible cover has an open configuration and a storage configuration. In the open configuration, the flexible cover extends along the roll cage from the first end attached to the rigid cover to the second end attached to a portion of the roll cage spaced from the rigid cover. In the storage configuration, the entire length of the flexible cover including the second end is removably secured against the rigid cover.

In a further aspect, the top includes an accessory bar attached to the rigid cover. The accessory bar is adapted for the installation of at least one vehicle accessory.

In another aspect, in the storage configuration, the flexible cover is secured against the rigid cover in one of a rolled and a folded configuration.

In another aspect, the rigid cover is adapted to be disposed along the forward portion of the roll cage with the flexible cover extending rearwardly therefrom.

In an additional aspect, the flexible cover is attached to a top surface of the rigid cover.

In yet another aspect, the flexible cover has a left side portion and a right side portion extending downwards at least partially between the first and second ends of the flexible cover.

In a further aspect, the flexible cover has a second end portion extending downward from the second end between a left side and a right side of the flexible cover.

In a further aspect, the flexible cover is removably attached to the rigid cover.

In an additional aspect, the top includes a C-shaped adaptor attached to the rigid cover. A loop is defined by the first end of the flexible cover. One of a rod, tube and rope extends in the loop, thereby retaining the loop in the C-shaped adaptor to attach the flexible cover to the rigid cover.

In another aspect, the top includes at least one first end fastener to attach the first end of the flexible cover to at least one of: the roll cage and the rigid cover. In some embodiments, the at least one first end fastener is two first end fasteners, each first end fastener being attached to one of the left and right ends of the first end of the flexible cover. In some embodiments, the at least one first end fastener is an adjustable strap having an adjustable length to removably secure the entire length of the flexible cover, when in the storage configuration, to the at least one of the roll cage and the rigid cover.

In another aspect, the top includes a flexible cover fastener removably securing the entire length of the flexible cover, in the storage configuration, to the rigid cover and/or the roll cage.

In another aspect, each of the at least one fastener is an adjustable strap having an adjustable length to permit tightening of the flexible cover extended over the roll cage in the open configuration.

In yet another aspect, the at least one fastener is two fasteners, each of the two fasteners being attached at one of a left corner and a right corner of the second end of the flexible cover to attach the corresponding one of the left and right corners to the roll cage.

In another aspect, the present provides a roll cage and top assembly for a vehicle. The roll cage includes a left side support structure and a right side support structure connected to the vehicle frame. The roll cage also includes a front arm connecting a forward portion of the left side support structure and a forward portion of the right side support structure, and a rear arm connecting a rearward portion of the left side structure and a rearward portion of the right side structure. The top has at least one of the aspects described above. The rigid cover is attached to the front arm and/or the rear arm.

In a further aspect, the rigid cover is disposed over the front arm and fastened thereto. In the open configuration, the at least one fastener of the flexible cover is removably fastened to the rear arm and/or the rearward portion of each of the right and left side support structures.

In an additional aspect, the second end of the flexible cover has a portion extending over the rear arm and downward therefrom when the flexible cover is in the open configuration.

In another aspect, the present provides a vehicle including a frame. A cockpit area is defined by the frame and has at least one seat. A roll cage is disposed above the cockpit area and connected to the frame. The vehicle also has a top having at least one of the aspects mentioned above.

In a further aspect, the at least one seat is two seats disposed side-by-side to accommodate two riders seated side-by-side. For purposes of the present application, terms related to spatial orientation when referring to the vehicle and components in relation to the vehicle, such as "forwardly", "rearwardly", "left", "right", "above" and "below", are as they would be understood by a driver of the vehicle, with the vehicle in a straight ahead orientation (i.e. not steered left or right), and in an upright position (i.e. not tilted). The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 6 is a top plan view of the roll cage and top of FIG. 2, with the flexible cover removed for clarity;

DETAILED DESCRIPTION

The present invention will be described below with respect to a side-by-side vehicle (SSV) designed to accommodate two riders seated side-by-side. However, it is contemplated that some aspects of the invention could be adapted for use on other kinds of vehicles, such as golf carts and the like, having an open cockpit area with a roll cage disposed thereabove. It is further contemplated that the top could also be adapted for use on boats.

Figure 1:
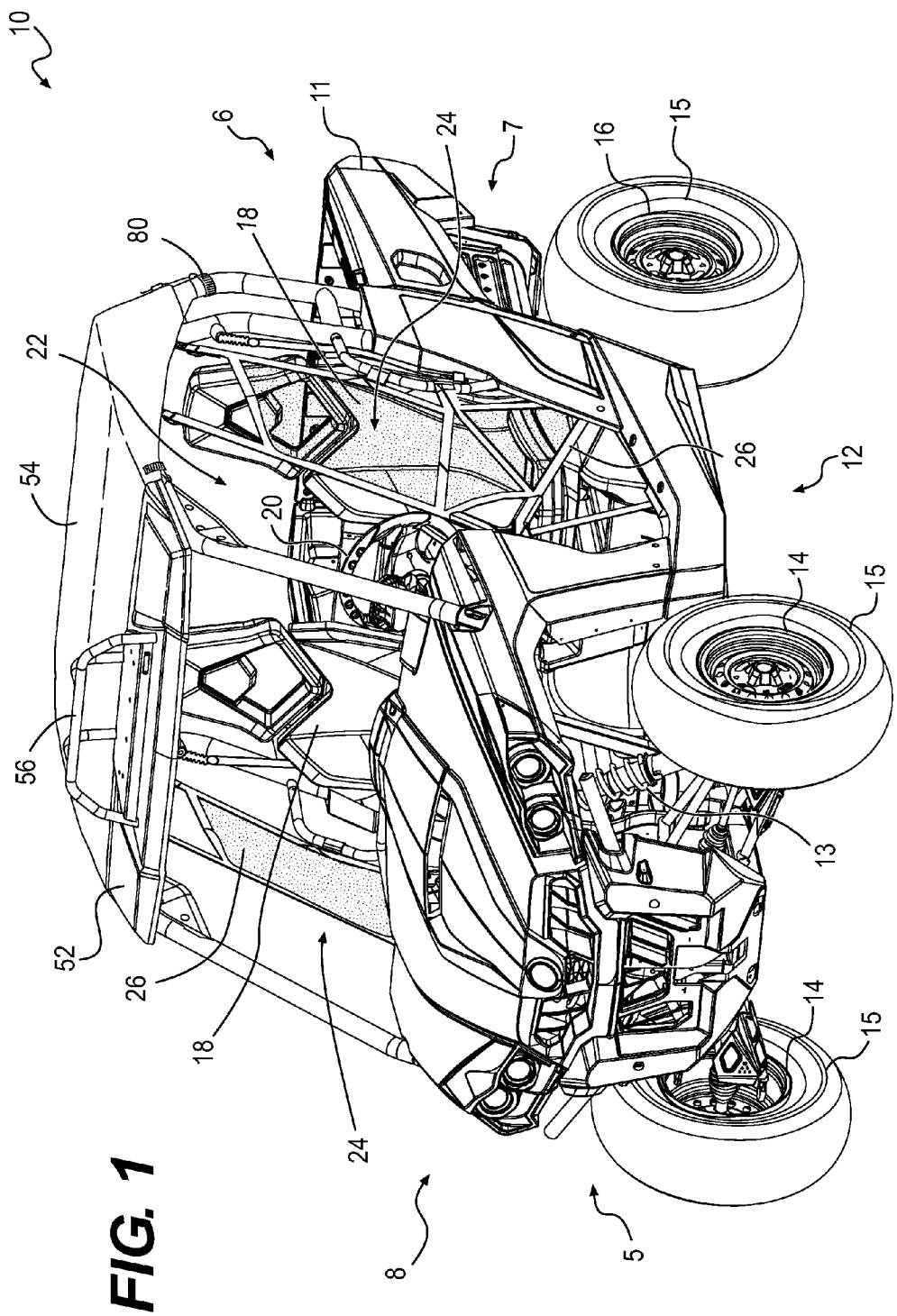
FIG. 1 is a perspective view, taken from a front, left side, of a vehicle.

FIG. 1 illustrates a vehicle 10 having a front end 5, a rear end 6, a left side 7, and a right side 8, consistently defined with the forward travel direction. The vehicle 10 includes a frame 12 to which a vehicle body is mounted.

A pair of front wheels 14 is suspended from the front portion of the frame 12 via front suspension 13. A pair of rear wheels 16 is suspended from the rear portion of the frame 12 via rear suspension 13. Each of the four wheels 14, 16 has a tire 15. It is contemplated that the vehicle 10 could have six or more wheels.

A cockpit area 22 is disposed in the middle portion of the frame 12. The cockpit area 22 comprises two seats 18 (left and right). The seats 18 are mounted laterally beside each other to accommodate a driver and a passenger (riders) of the vehicle 10. The seats 18 are bucket seats. It is contemplated that the seats 18 could be other types of recumbent seats.

An engine (not shown), is mounted to the middle portion of frame 12 between the right and the left seats 18. The engine is operatively connected to the four wheels 14 to power the vehicle 10. It is contemplated that the engine could be operatively connected only to the front wheels 14 or only to the rear wheels 16.

A cargo box 11 is pivotally mounted to the frame 12 rearward of the seats 18. It is contemplated that the cargo box 11 could be omitted.

A steering assembly includes a steering wheel 20 disposed in front of the left seat 18. It is contemplated that the steering wheel 20 could be disposed in front of the right seat 18. The steering assembly is operatively connected to the two front wheels 14 to permit steering of the vehicle 10.

The cockpit area 22 has openings 24 on the left and right sides 7 of the vehicle 10 through which the riders can enter and exit the vehicle 10. A lateral cover 26, made of flexible straps and flexible panels of meshed material, is selectively and partially disposed across each opening 24. The lateral covers 26 are intended to be disposed across the openings 24 when the riders are riding the vehicle 10 and to be opened when the riders desire entry into or exit from the cockpit area 22. It is contemplated that only one of the left and right side openings 24 could be selectively partially covered by a lateral cover 26.

A roll cage 30 is connected to the frame 12 and disposed above the cockpit area 22. The roll cage 30 is constructed from metal tubes and contributes to protecting the riders in the event that the vehicle 10 rolls over.

A top 50, extending above the cockpit area 22, protects the riders seated underneath in the cockpit area 22 from sun, rain, snow and wind. The top 50 can also be used for mounting accessories on the vehicle 10. The top 50 is supported by the roll cage 30 and is selectively extended above the seats 18 depending on the riders' preferences.

The top 50 has a rigid cover 52 and a flexible cover 54. The rigid cover 52 of the top 50 extends above the forward portion of the cockpit area 22 and functions as a sun visor partially shading the riders when the sun is disposed above or ahead of the vehicle 10. The rigid cover 52 can also be used to mount vehicle accessories such as a set of lights. The flexible cover 54, disposed rearward of the rigid cover 52, functions as a roof for the riders, shielding the riders from sun, wind, rain and snow.

The vehicle 10 has other features and components such as an exhaust, a transmission and the like. As it is believed that these features and components would be readily recognized by one of ordinary skill in the art, further explanation and description of these components will not be provided herein.

The roll cage 30 and the top 50 will now be described in further detail with reference to FIGS. 2 to 9.

Figure 9:
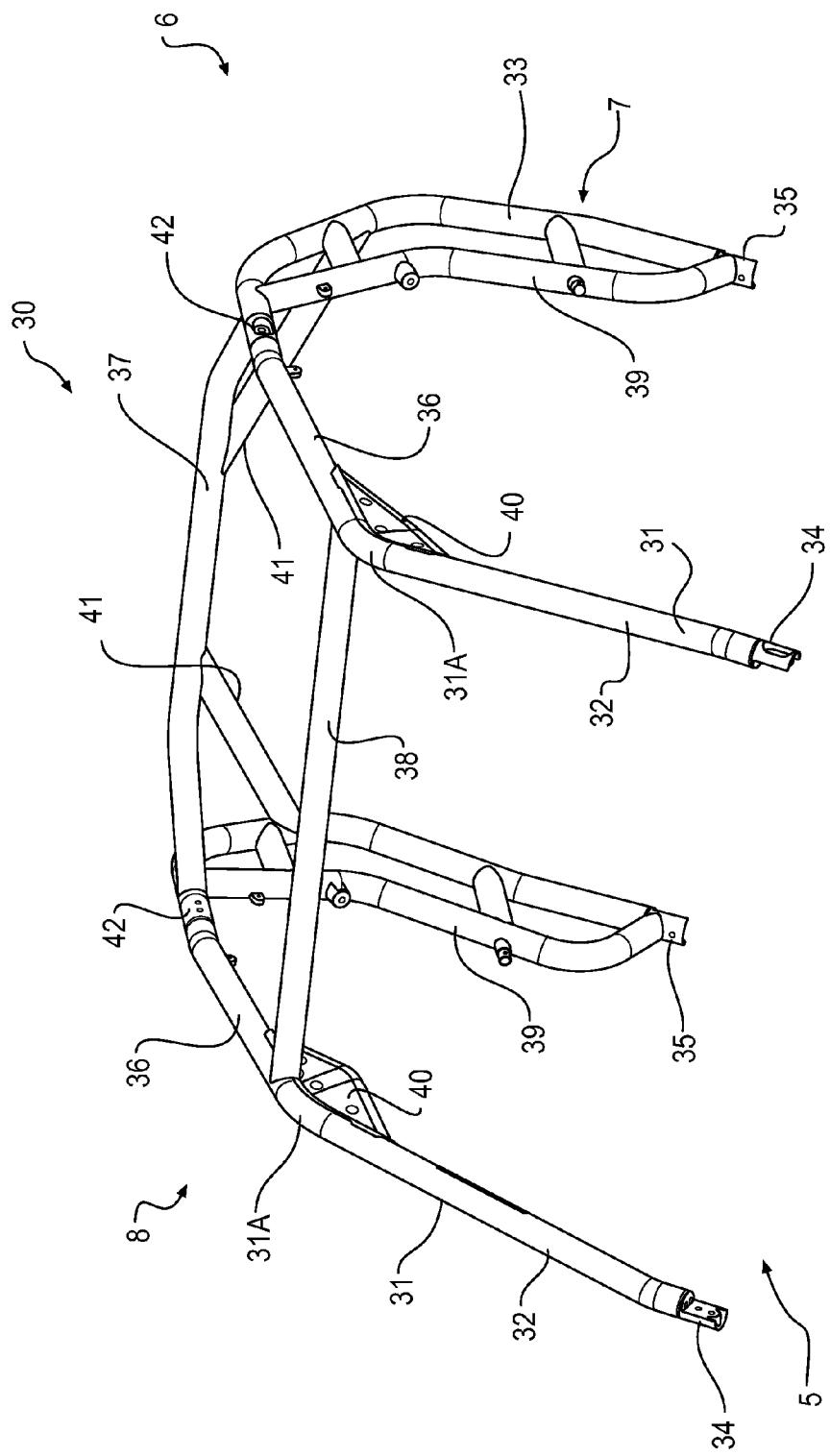
FIG. 9 is a perspective view, taken from a front, left side, of the roll cage of the vehicle of FIG. 1.

As can be seen in FIG. 9, the roll cage 30 has a left side support structure 31 and a right side support structure 31 extending longitudinally on the left side 7 and right side 8, respectively, of the vehicle 10. A front arm 38 and a rear arm 37, each extending laterally across the vehicle 10 between its right and left sides 7, 8 between the left and right side support structures 31.

Each of the left and right side support structures 31 is formed as an inverted U-shaped structure. The left side support structure 31 has a front left arm 32 and a rear left arm 33, each extending generally vertically, and a left lateral arm 36 extending generally horizontally between the upper ends of the front and rear left arms 32, 33. The right side support structure 31 has a front right arm 32 and a rear right arm 33, each extending generally vertically, and a right lateral arm 36 extending generally horizontally between the upper ends of the front and rear right arms 32, 33. The front left arm 32 and the front right arm 32 are connected to the frame at their respective lower ends 34. The rear left arm 33 and the rear right arm 33 are connected to the frame at their respective lower ends 35.

The front arm 38 connects to the left and right lateral arms 36 just rearward of the forwardmost point 31a of the upper portion of the side support structures 31. The front arm 38 is connected to the left and right lateral arms 36 near their respective connections to the corresponding front left and front right arms 32. It is contemplated that the front arm 38 could be connected to the front left and right arms 32 of the side support structures 31. An additional support member 40 is provided at the connection between the left side support structure 31 and the left front arm 38. An additional support member 40 is also provided at the connection between the right side support structure 31 and the right front arm 38.

The rear arm 37 connects to each of the left and right side support structures 31 at the connections between the respective left and right lateral arms 36 and their respective rear left and right arms 33. A left reinforcement member 39 extends between the left lateral arm 36 and the lower end 35 of the rear left arm 33. A right reinforcement member 39 extends between the right lateral arm 36 and the lower end 35 of the rear right arm 33. A pair of rear reinforcement members 41 is also provided in the rear end of the roll cage 30. Each rear reinforcement member 41 is connected between the rear arm 37 and one of the rear left and right arms 33. It is contemplated that the support members 40 and the reinforcement members 39, 41 could be omitted.

The lateral arms 36 connect the forward and rearward portions of the roll cage 30. Each of the left and right side support structures 31 is formed as two pieces joined together by complementary flanges 42 riveted to each other. The connection 42 between the forward and rearward portion of the each side support structure 31 is made along the lateral arm 36 forward of the location where the reinforcement member 39 is connected thereto. The front left arm 32 and the rear left arm 33 are each integrally formed with the respective forward and rearward portions of the left lateral arm 36. Similarly, the front right arm 32 and the rear right arm 33 are each integrally formed with the respective forward and rearward portions of the right lateral arm 36. It is contemplated that each side support structure 31 of the roll cage 30 could be formed as a single integral piece or as more than two pieces.

The upper portion of the roll cage 30, generally defined by the left and right lateral arms 36, the front arm 38 and the rear arm 37, slopes downwards towards the forward end 5 of the vehicle 10. The front left and right arms 31 slope forward and downward from the upper portion of the roll cage 30. The rear left and right arms 33 extend rearward and downward from the upper portion the roll cage 30 but in the lower portion of the roll cage 30, the arms 33 bend forward and downward to their lower ends 35 connected to the frame 12. It is contemplated that the upper portion of the roll cage 30 could not slope forward and downward. It is contemplated that the roll cage 30 could have a structure other than as shown in the illustrated embodiment, with an upper portion extending generally horizontally.

With reference now to FIGS. 2 to 8, the top 50 will be described in more detail.

The rigid cover 52 is disposed over the forward portion of the roll cage 30. The rigid cover 52 has a top surface 57, a bottom surface 58, left and right sides 59, a front end 63 and a rear end 65. The rigid cover 52 is made of plastic HMWPE BA 50-100. It is contemplated that the rigid cover 52 could be made of any suitable material.

Figure 3A:
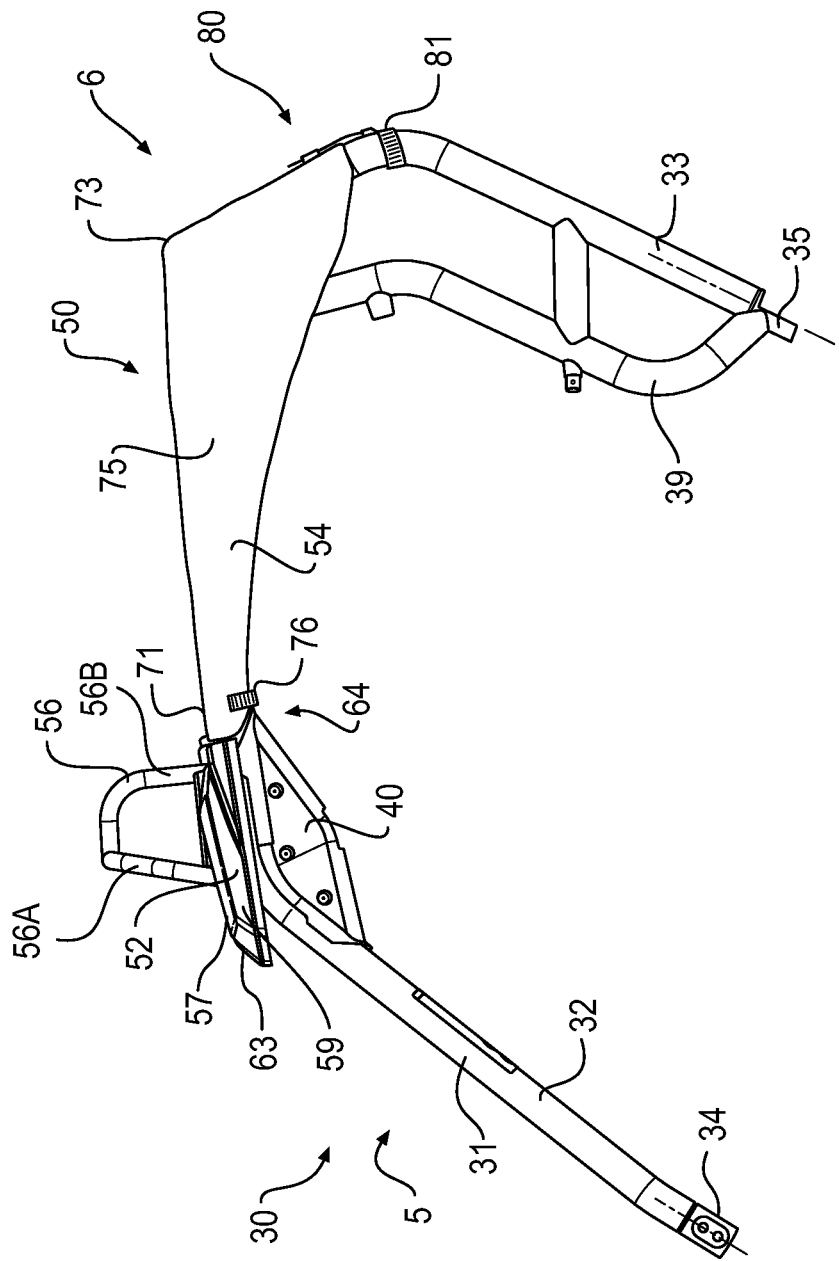
FIG. 3A is a left side elevation view of the roll cage and top of FIG. 2.
Figure 3B:
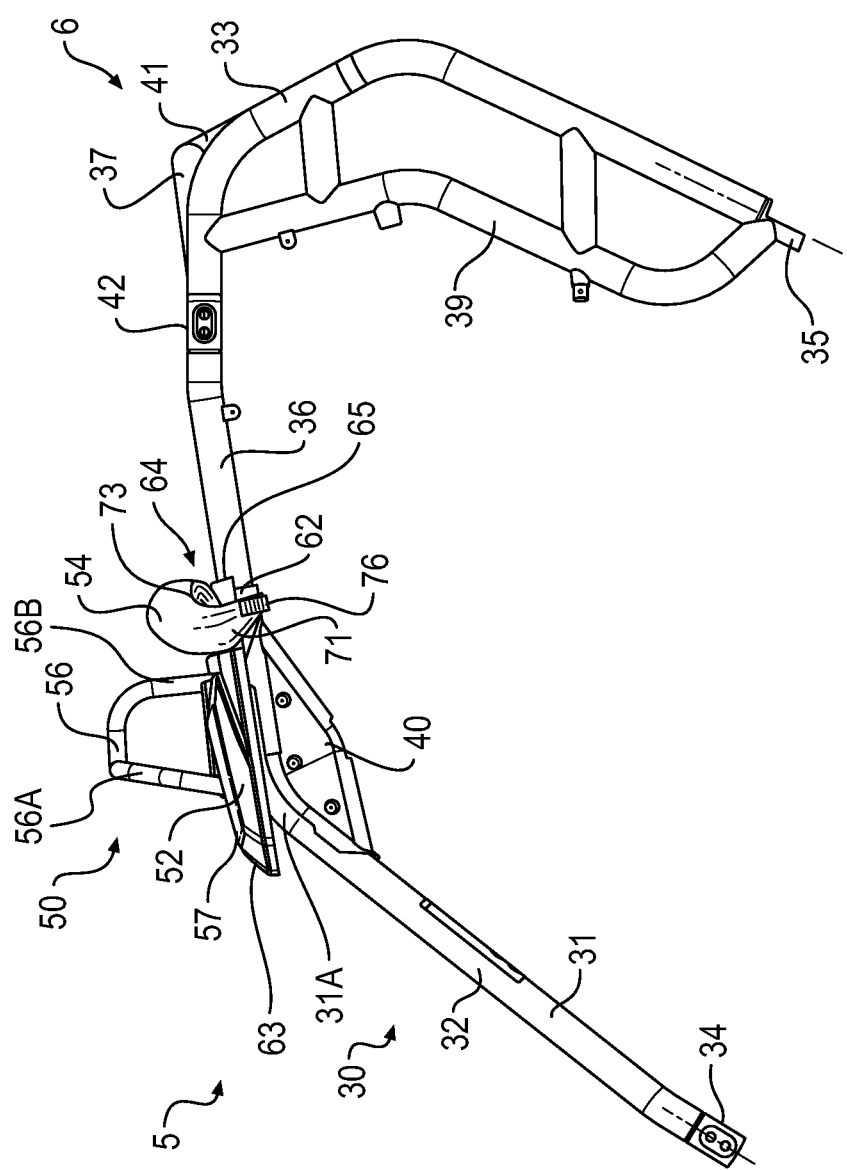
FIG. 3B is a left side elevation view of the roll cage and top of FIG. 2, with the flexible cover of the top shown in a storage configuration.
Figure 8:
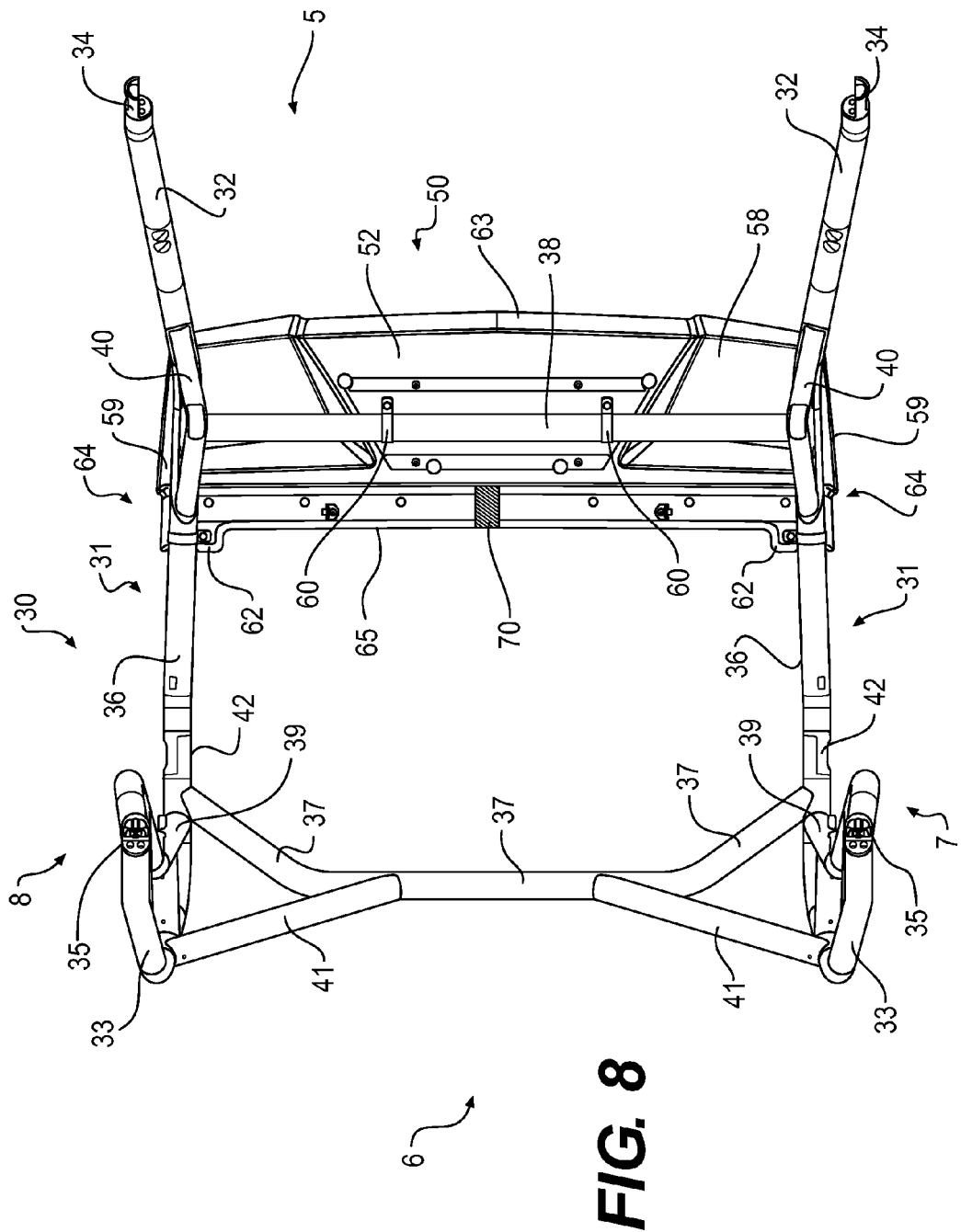
FIG. 8 is a bottom plan view of elevation view of the roll cage and top of FIG. 2, with the flexible cover removed for clarity.

As best seen in FIGS. 3B and 8, the front end 63 of the rigid cover 52 is disposed forward of the front arm 38 and the forwardmost point 31a of the upper portion of the roll cage 30. The left and right lateral arms 36 are disposed along the inner edge of the sides 59 of the rigid cover 52. The rear end 65 of the rigid cover 52 is disposed rearward of the front arm 38 of the roll cage 30.

Figure 2:
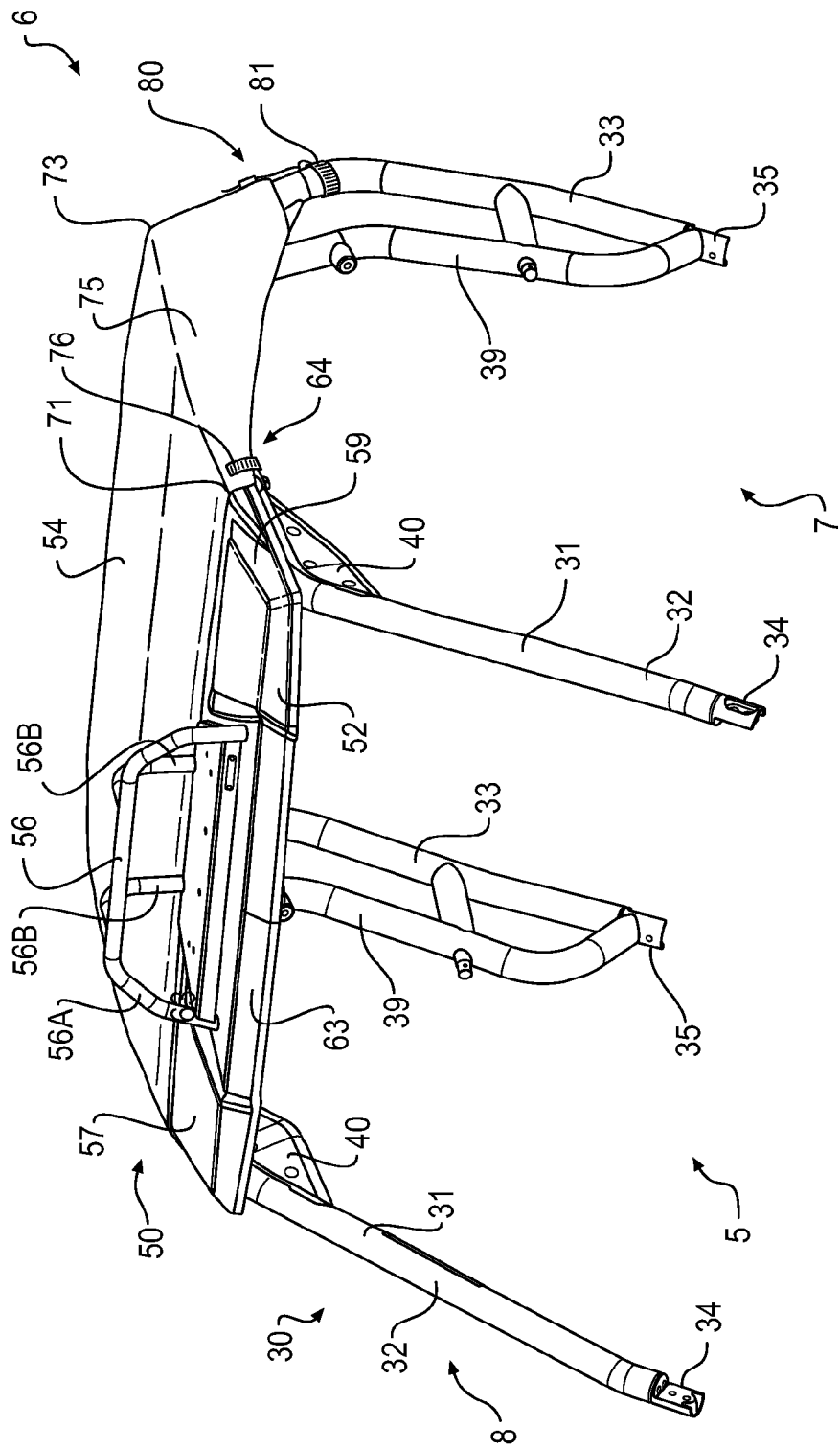
FIG. 2 is a perspective view, taken from a front, left side, of the roll cage and top of the vehicle of FIG. 1, showing the top in an open configuration.
Figure 4:
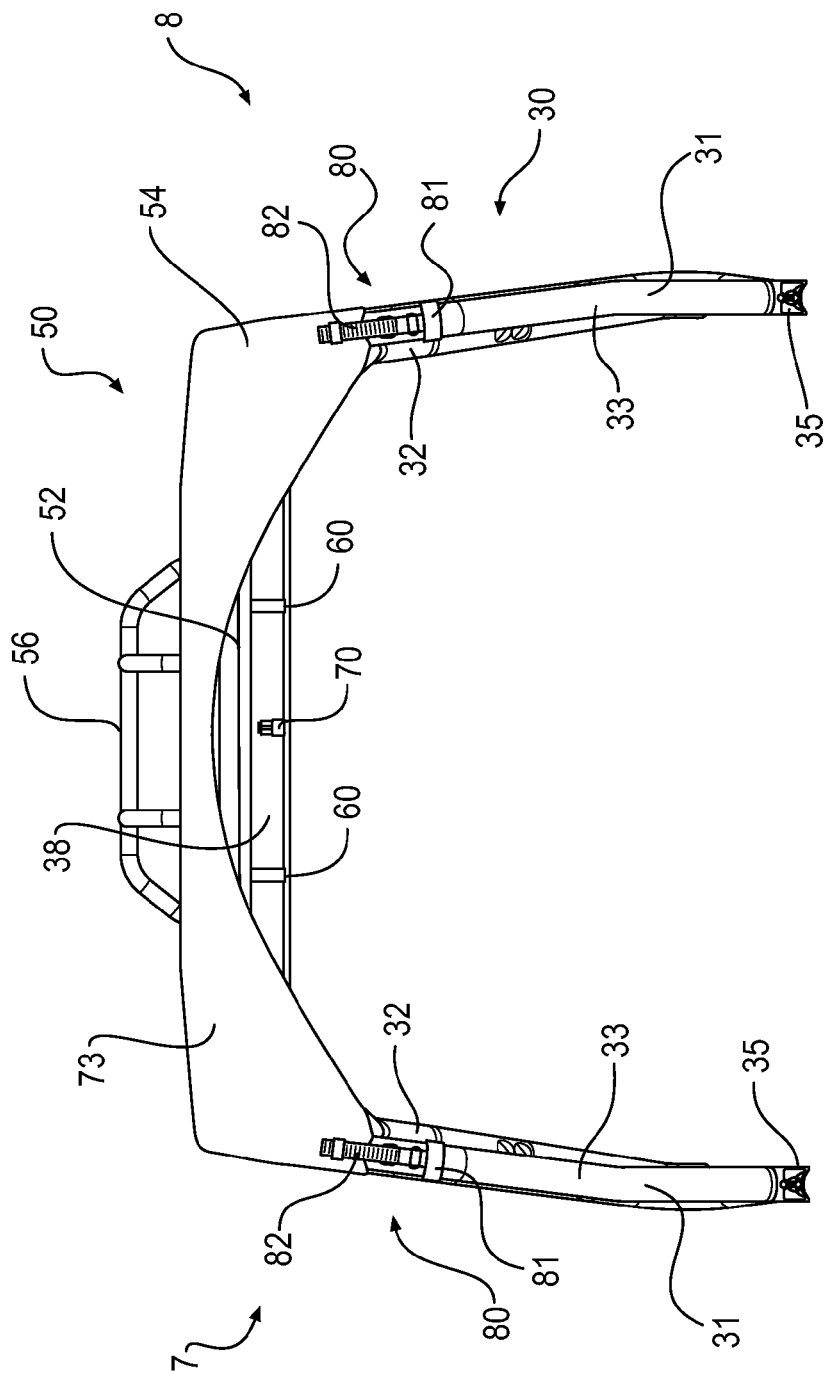
FIG. 4 is a rear elevation view of the roll cage and top of FIG. 2.

With reference to FIGS. 2 to 4, the top surface 57 of the rigid cover 52 slopes downward and forward towards the front end 63. The front end 63 and the sides 59 of the rigid cover 52 extend downward from the top surface 57. This configuration helps to direct rain and snow off the top surface, away from the riders seated in the cockpit area 22 underneath, and in some situations, also helps to more effectively shade the riders from the sun.

Figure 5:
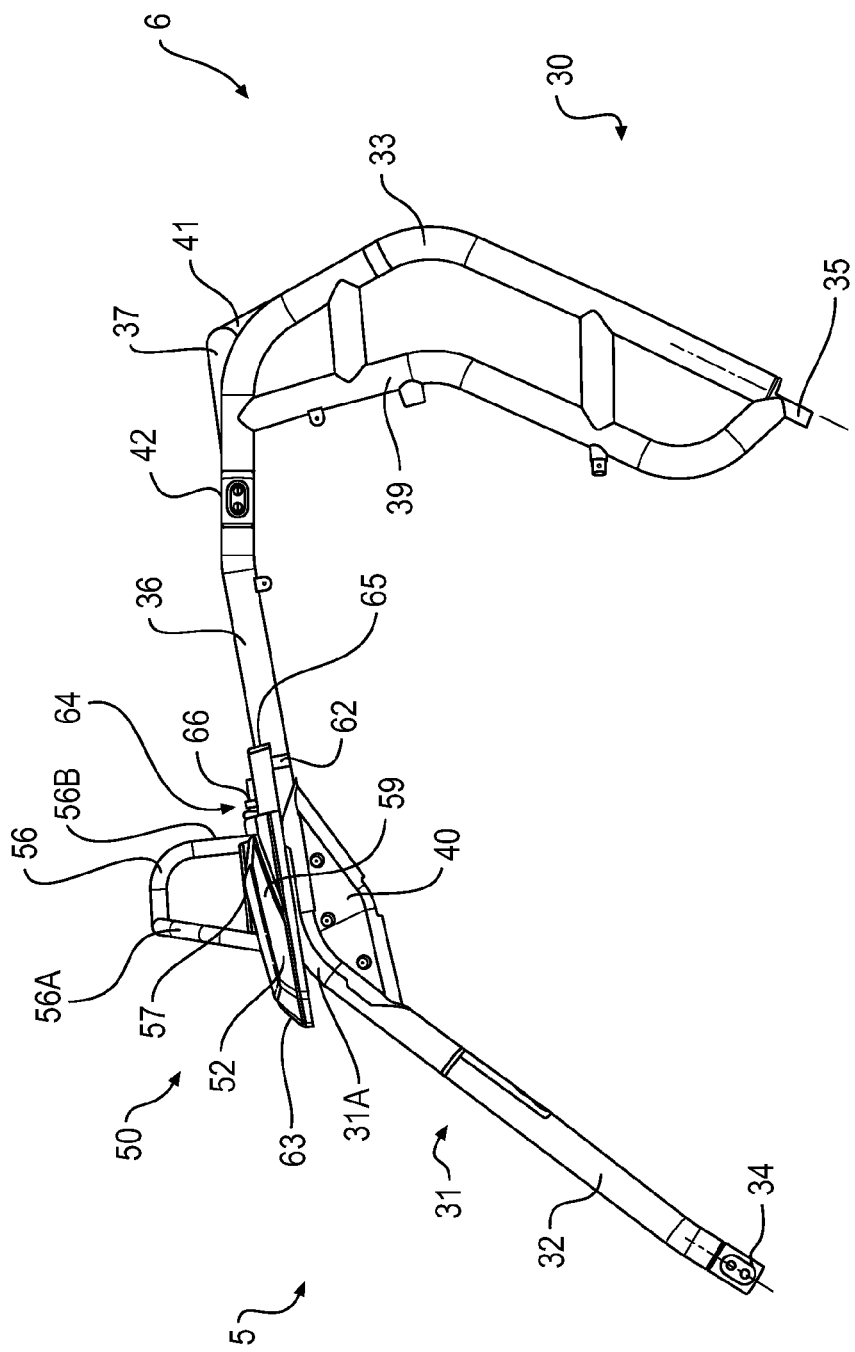
FIG. 5 is a left side elevation view of the roll cage and top of FIG. 2, with the flexible cover removed for clarity.

With reference to FIGS. 5 and 8, the rigid cover 52 is rigidly attached to the roll cage 30 by clamps 60 and 62. As best seen in FIG. 8, the clamps 60 fix the middle portion of the rigid cover 52 to the front arm 38, and the clamps 62 fix the rear portion 64 of the rigid cover 52 to the left and right lateral arms 36. The clamps 60 and 62, bolted to the bottom surface 58 of the rigid cover 52, can be removed with the aid of a screwdriver to remove the rigid cover 52 from the vehicle 10. The rigid cover 52 can similarly be reinstalled when desired/needed.

An accessory bar 56 is attached to the top surface 57 of the rigid cover 52 to facilitate the mounting of accessories on the top 50. The accessory bar 56 is formed of hollow metal tubes but it is contemplated that it could be made of other suitable material.

The accessory bar 56 extends upwards from the top surface 57 of the rigid cover 52. The accessory bar 56 is bolted to the bottom surface 58 (as best seen in FIG. 8) of the rigid cover 52. Wires and other such connections needed for operation of the vehicle accessories mounted on the rigid cover 52 can be extended through the hollow metal tubes of the accessory bar 56.

The accessory bar 56 includes an inverted U-shaped bar 56a connected to the rigid cover 52 longitudinally forward of the front arm 38. Two rear support bars 56b extend rearward from the U-bar 56a to connect to the rigid cover 52 rearward of the front arm 38. It is contemplated that the accessory bar 56 could have a different structure. It is also contemplated that the accessory bar could be formed integrally with the rigid cover 52.

The accessory bar 56 of the illustrated embodiment can be selectively installed when or where needed, and based upon the preferences of the riders. It is contemplated that vehicle accessories could also be attached to the rigid cover 52 directly and/or by means other than the accessory bar 56. It is contemplated that the accessory bar 56 could be omitted.

As best seen in FIGS. 5, and 7A to 7C, the top surface 57 of the rigid cover 52 is discontinuous. A rear portion 64 of the top surface 57, extending rearward of the accessory bar 56 is disposed vertically lower than the top surface 57 just forward of the rear portion 64. It is contemplated that the top surface 57 of the rigid cover 52 could be continuous and that the top surface 57 of the rear portion 64 could not be disposed vertically lower than the top surface 57 just forward of the accessory bar 56.

With reference to FIGS. 1 to 4, the flexible cover 54 is attached to the rear portion 64 of the rigid cover 52. An adaptor 66 attaches a front end 71 of the flexible cover 54 to the rear end 64 of the rigid cover 52, as will be described below. The adaptor 66 extends laterally along the top surface 57 of the rigid cover 52, between the sides 59.

Figure 7A:
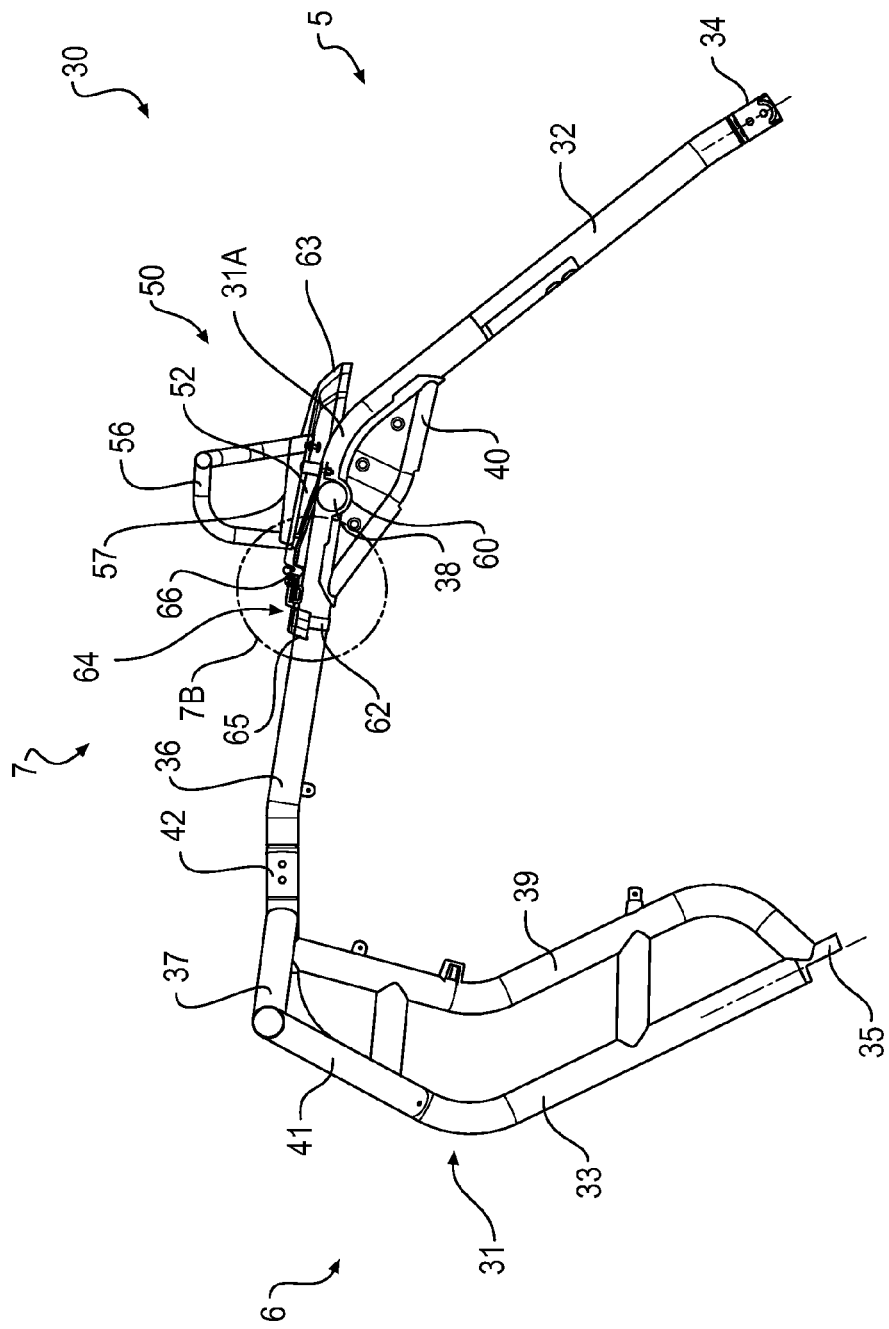
FIG. 7A is a cross-sectional view, taken along the line A-A of FIG. 6, showing the roll cage and top of FIG. 2 with the flexible cover removed for clarity.
Figure 7B:
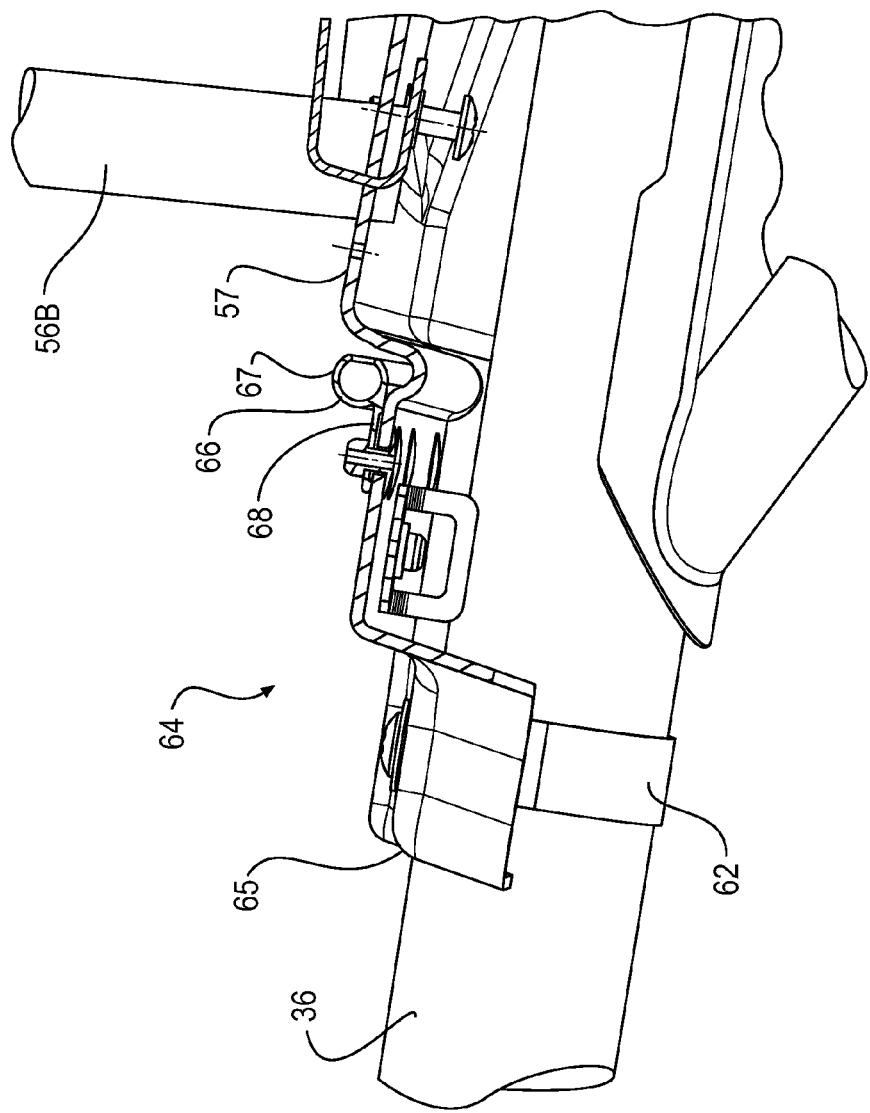
FIG. 7B is an enlarged cross-sectional view, taken along the line A-A of FIG. 6, showing a portion of the roll cage and top of FIG. 7A with the flexible cover removed for clarity.
Figure 7C:
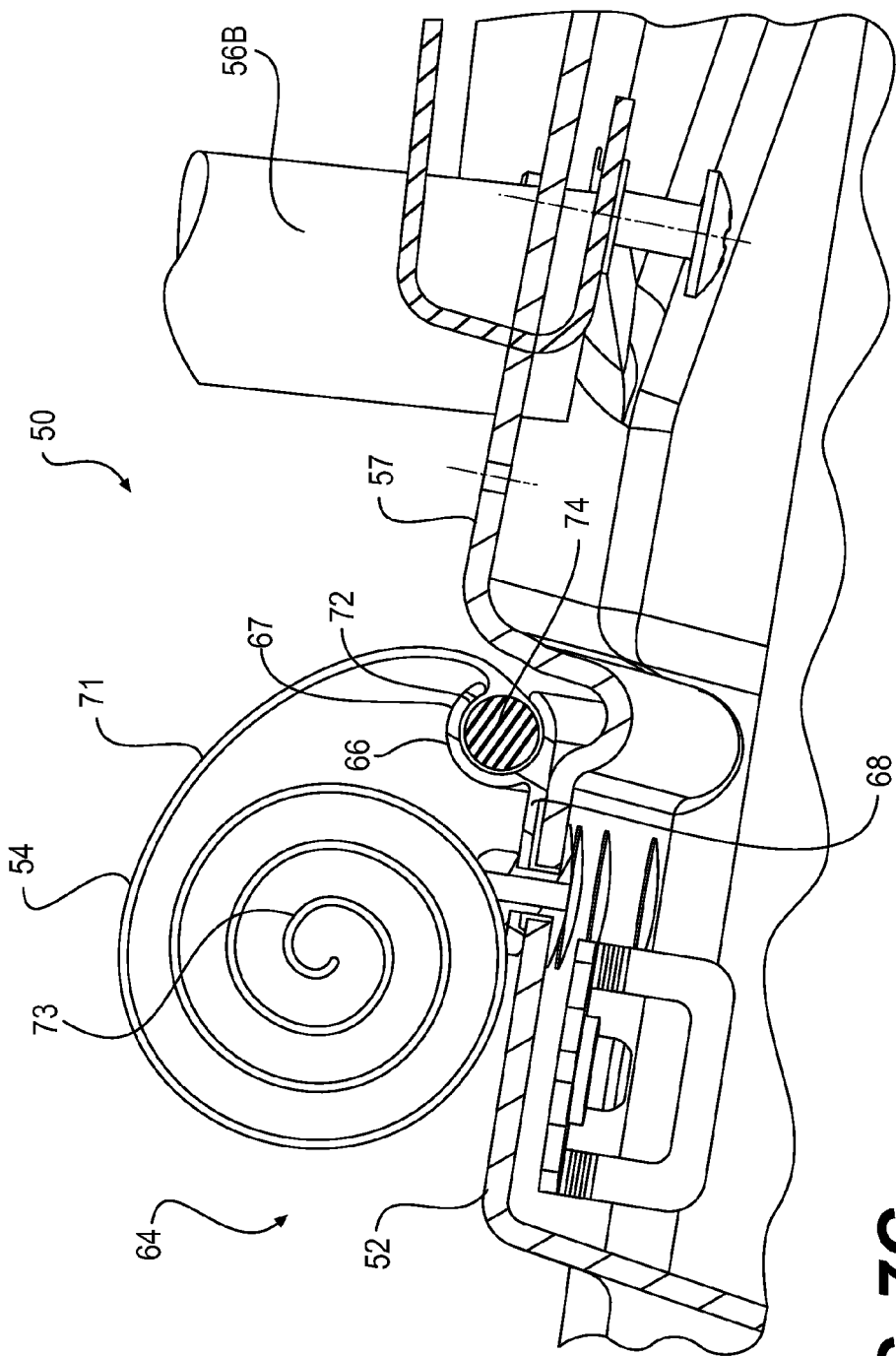
FIG. 7C is an enlarged cross-sectional view, taken along the line A-A of FIG. 6, showing the portion of the roll cage and top of FIG. 7B, with the flexible cover shown in the storage configuration.

With reference to FIGS. 7B and 7C, the adaptor 66 has a C-shaped portion 67 which retains the flexible cover 54 and a portion 68 that is riveted to the rigid cover 52. The opening of the C-shaped portion 67 is disposed facing forwardly and the portion 68 extends rearwardly from the C-shaped portion 67. The front end 71 of the flexible cover 54 forms a loop 72. The looped end 72 of the flexible cover 54 is inserted inside the C-shaped portion 67 of the adaptor 66. A rod 74, having a diameter larger than the opening of the C-shaped portion 67, is inserted inside the loop 72 to retain the looped front end 72 of the flexible cover 54 inside the C-shaped portion 67 of the adaptor 66. The rod 74 is prevented from sliding laterally out of the adaptor 66 by friction. It is contemplated that the ends of the loop 72 extending outside the C-shaped portion 67 on the left and right sides could be plied and sewed to form a bulge, thereby preventing the rod 74 held inside the loop 72 from sliding out. It is contemplated that a tube or a rope could be used instead of the rod 74 to retain the looped front end 72 in the C-shaped portion 67. The adaptor 66 is made of aluminum, although it is contemplated that it could be made of any suitable material.

The flexible cover 54 has the front end 71 mentioned above, a rear end 73 opposite to the front end 71, and left and right sides 75 each extending between the front and rear ends 71, 73. The front and rear ends 71, 73 of the flexible cover define its length. The flexible cover 54 is made of solution dyed 600D polyester. It is contemplated that the flexible cover 54 could be made of any suitable material.

The rear end 73 extends downwards from the rear arm 37, just below the rear reinforcement arm 41 of the roll cage 30. The rear end 73 extends lower at the corners near the rear left and rear right arms 33 than in the middle between the arms 33.

Each of the left and right sides 75 extends downwards below the respective left and right lateral arms 36 of the roll cage 30. The sides 75 extend lower in the rearward portion near the rear end 73 than in the forward portion near the front end 71.

It is contemplated that the flexible cover 54 could extend lower or higher than as shown along the rear end 73, and along the left and right sides 75. It is contemplated that the downwardly extending rear end and sides 73, 75 could be omitted and that the flexible cover 54 could have only a horizontally extending portion between its front and rear ends 71, 73 and left and right sides 75.

With reference to FIGS. 2, 3A and 4, the flexible cover 54 has an open configuration where the flexible cover 54 extends across the cockpit area 22 to the rear of the roll cage 30 where the rear end 73 of the flexible cover 54 is fastened to the roll cage 30.

When the riders wish to leave the cockpit area 22 uncovered, the flexible cover 54 can be placed in a storage configuration as shown in FIG. 3B. In the storage configuration, the rear end 73 of the flexible cover 54 is detached from the roll cage 30 and the flexible cover 54 is rolled from the rear towards the front. The rolled-up flexible cover 54 is tucked in under the front end 73 and secured against the rigid cover 52 for storage. It is contemplated that the rolled-up flexible cover 54 could be placed above the front end 71 and secured against the rigid cover 52 for storage. It is also contemplated that the flexible cover 54 could be folded instead of being rolled-up in the storage configuration.

The rolled-up flexible cover 54 is supported on the top surface 57 of the rear portion 64 and does not extend substantially above the top surface 57 of the rigid cover 52 just forward of the rear portion 64. The top 50 therefore appears to have a generally level top surface even with the flexible cover 54 being rolled up in the storage configuration.

Although the rigid cover 52 is also removable, it is typically left in place without causing any inconvenience to the riders as it is disposed only over the front portion of the cockpit area 22. Conveniently as well for the riders, with this configuration of the rigid cover 52, it is not necessary to remove any accessories that may be mounted on the rigid cover 52, either on the accessory bar 56 or elsewhere on the rigid cover 52. At the same time, such a configuration of the top 50 allows the cockpit area 22 to be quickly and easily covered or uncovered as needed by changing the flexible cover 54 between the open and storage configuration. As the top 50 remains fixed above the roll cage 30 even when it is not being used, the existing limited storage space (such as the cargo box 11) of the vehicle is not used up, and no additional storage space, specifically configured to fit the top 50 or any portion of the top 50, need be provided on the vehicle 10.

As best seen in FIGS. 2 to 3B, a strap 76 is attached at each of the left and right corners of the front end 71 of the flexible cover 54 (only the left side strap 76 is seen in the Figures). Each of the left and right straps 76 extends around the corresponding side 59 of the rigid cover 52 and the corresponding lateral left and right arm 36 to secure the flexible cover 54 against the rear portion 64 of the rigid cover 52 and the roll cage 30.

The straps 76 are adjustable straps that can be tightened or loosened as needed i.e. the strap lengths can be adjusted by pulling on the end of the strap (not shown) inserted through a buckle (not shown). In the open configuration (FIG. 3A) the straps 76 are pulled short to tightly secure the front end 72 of the flexible cover 54 against the rear portion 64 of the rigid cover 52. In the storage configuration (FIG. 3B), straps 76 are slightly lengthened to secure the left and right ends of the rolled-up flexible cover 54, tucked under the front end 71, against the rear portion 64 of the rigid cover 52. It is contemplated that the straps 76 could be elastic straps that could stretch to secure the roll-up flexible cover 54 against the rigid cover 52.

A strap 70 (as best seen in FIGS. 4 and 8) is attached to bottom surface 58 of the rear portion 64 of the rigid cover 52. The strap 70 secures the middle portion of the rolled-up flexible cover 54 to the rigid cover 52 when the flexible cover 54 is placed in a storage configuration.

As best seen in FIG. 4, a strap 80 is attached to each of the left and right corners of the rear end 73 of the flexible cover 54. The straps 80 fasten the flexible cover 54 to the rear end of the roll cage 30. In the storage configuration, the straps 80 are held inside the rolled up flexible cover 54. Each strap 80 has a hook-and-loop fastener band 81 and an adjustable strap 82 attaching the hook-and-loop fastener band 81 to the flexible cover 54. The hook-and-loop fastener band 81 attaches to the corresponding rear left and rear right arm 33 just below the corresponding rear reinforcement arm 41. The flexible cover 54 can be tightened by pulling on the strap 82 to shorten it. The hook-and-loop fastener band 81 is prevented from sliding upwards along the rear left and rear right arm 33 by the rear reinforcement arm 41 extending outward therefrom.

It is contemplated that the rear end 73 of the flexible cover 54 could be attached to the rear arm 37 and/or the rear reinforcement arm 41 of the roll cage 30 instead of, or in addition to, the rear left and rear right arm 33 as shown in the illustrated embodiment. It is also contemplated that the rear end 73 of the flexible cover 54 could be attached to the roll cage 30 by other suitable means. It is contemplated that the flexible cover 54 could be made of stretchable material that stretches to fit around the roll cage 30 when in an open configuration.

It is also contemplated that additional straps could be provided on the flexible cover 54, for example, along the sides between the front and rear ends 71, 73 to secure the flexible cover 54 to the roll cage 30. It is contemplated that the flexible cover 54 could have other partially open configurations between the open and closed configurations of FIGS. 3A and 3B where it covers a portion of the cockpit area 22. It is also contemplated that the rigid cover could be attached at the rear end of the roll cage 30, and the flexible cover 54 could extends towards the front therefrom.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A top for a vehicle having a roll cage disposed over a seat of the vehicle, the top comprising:
   a rigid cover adapted to be fixed to a first portion of the roll cage; and
   a flexible cover having a first end and a second end defining a length of the flexible cover therebetween;
     the first end of the flexible cover being attached to the rigid cover,
     the second end of the flexible cover having at least one fastener for attaching the second end to a second portion of the roll cage, the second portion being spaced from the first portion,
     the flexible cover having an open configuration and a storage configuration,
       in the open configuration, the flexible cover being adapted to extend along the roll cage from the first end attached to the rigid cover to the second end attached to the second portion of the roll cage spaced from the rigid cover, and
       in the storage configuration, the entire length of the flexible cover including the second end being removably secured against the rigid cover,
     the rigid cover being adapted to be attached to the first portion in the open and storage configurations of the flexible cover, and when the flexible cover is being moved between the open and storage configurations,
     the flexible cover being movable between the open configuration and the storage configuration without detachment of the rigid cover from the first portion of the roll cage.

2. The top of claim 1, further comprising an accessory bar attached to the rigid cover, the accessory bar being adapted for the installation of at least one vehicle accessory.

3. The top of claim 1, wherein in the storage configuration, the flexible cover is secured against the rigid cover in one of a rolled and folded configuration, and the second end is movable toward the rigid cover for moving the flexible cover from the open configuration to the storage configuration.

4. The top of claim 1, wherein the rigid cover is adapted to be disposed along the forward portion of the roll cage with the flexible cover extending rearwardly therefrom.

5. The top of claim 1, wherein the flexible cover is attached to a top surface of the rigid cover.

6. The top of claim 1, wherein the flexible cover has a left side portion and a right side portion extending downwards at least partially between the first and second ends of the flexible cover.

7. The top of claim 1, wherein the flexible cover has a second end portion extending downward from the second end between a left side and a right side of the flexible cover.

8. The top of claim 1, wherein the flexible cover is removably attached to the rigid cover.

9. The top of claim 1, further comprising:
   a C-shaped adaptor attached to the rigid cover;
   a loop defined by the first end of the flexible cover; and
   one of a rod, tube and rope extending in the loop, thereby retaining the loop in the C-shaped adaptor to attach the flexible cover to the rigid cover.

10. The top of claim 1, further comprising at least one first end fastener to attach the first end of the flexible cover to at least one of: the roll cage and the rigid cover.

11. The top of claim 10, wherein the at least one first end fastener is two first end fasteners, each first end fastener being attached to one of the left and right ends of the first end of the flexible cover.

12. The top of claim 10, wherein the at least one first end fastener is an adjustable strap having an adjustable length to removably secure the entire length of the flexible cover to the at least one of the roll cage and the rigid cover, when in the storage configuration.

13. The top of claim 1, further comprising a flexible cover fastener removably securing the entire length of the flexible cover, in the storage configuration, to at least one of:
   the rigid cover; and
   the roll cage.

14. The top of claim 1, wherein each of the at least one fastener is an adjustable strap having an adjustable length to permit tightening of the flexible cover extended over the roll cage in the open configuration.

15. The top of claim 1, wherein the at least one fastener is two fasteners, each of the two fasteners being attached at one of a left corner and a right corner of the second end of the flexible cover to attach the corresponding one of the left and right corners to the roll cage.

16. A roll cage and top assembly for a vehicle comprising:
   a roll cage comprising:
     a left side support structure connected to a vehicle frame;
     a right side support structure connected to the vehicle frame;
     a front arm connecting a forward portion of the left side support structure and a forward portion of the right side support structure; and
     a rear arm connecting a rearward portion of the left side structure and a rearward portion of the right side structure; and
   a top comprising:
     a rigid cover being attached to at least one of the front arm and the rear arm; and
     a flexible cover having a first end and a second end defining a length of the flexible cover therebetween;
       the first end of the flexible cover being attached to the rigid cover,
       the second end of the flexible cover having at least one fastener for attaching the second end to the roll cage, the flexible cover having an open configuration and a storage configuration, in the open configuration, the flexible cover extending along the roll cage from the first end attached to the rigid cover to the second end attached to a portion of the roll cage spaced from the rigid cover, and in the storage configuration, the entire length of the flexible cover including the second end being removably secured against the rigid cover, the rigid cover being attached to the at least one of the front arm and the rear arm in the open and storage configurations of the flexible cover, and when the flexible cover is being moved between the open and storage configurations, the flexible cover being movable between the open configuration and the storage configuration without detachment of the rigid cover from the at least one of the front arm and the rear arm.

17. The roll cage of claim 16, wherein:
the rigid cover is disposed over the front arm and fastened thereto; and
in the open configuration, the at least one fastener of the flexible cover is removably fastened to at least one of:
the rear arm, and
the rearward portion of each of the right and left side support structures.

18. The roll cage of claim 17, wherein the second end of the flexible cover has a portion extending over the rear arm and downward therefrom when the flexible cover is in the open configuration.

19. A vehicle comprising:
a frame;
a cockpit area defined by the frame and having at least one seat;
a roll cage disposed above the cockpit area and connected to the frame; and
a top comprising:
a rigid cover attached to a first portion of the roll cage; and
a flexible cover having a first end and a second end defining a length of the flexible cover therebetween;
the first end of the flexible cover being attached to the rigid cover,
the second end of the flexible cover having at least one fastener for attaching the second end to a second portion of the roll cage, the second portion being spaced from the first portion,
the flexible cover having an open configuration and a storage configuration,
in the open configuration, the flexible cover extending along the roll cage from the first end attached to the rigid cover to the second end attached to the second portion of the roll cage spaced from the rigid cover, and
in the storage configuration, the entire length of the flexible cover including the second end being removably secured against the rigid cover,
the rigid cover being attached to the first portion of the roll cage in the open and storage configurations of the flexible cover, and when the flexible cover is being moved between the open and storage configurations,
the flexible cover being movable between the open configuration and the storage configuration without detachment of the rigid cover from the first portion of the roll cage.

20. The vehicle of claim 19, wherein the at least one seat is two seats disposed side-by-side to accommodate two riders seated side-by-side.

* * * * *